Aug. 4, 1970  J. B. NICHOLSON  3,522,900
VALVE FOR PRODUCT DISPENSING CONTAINER
Filed Oct. 18, 1967  2 Sheets-Sheet 1

INVENTOR
JOHN B. NICHOLSON
BY Fred P. Kostka
ATT'Y.

Aug. 4, 1970   J. B. NICHOLSON   3,522,900
VALVE FOR PRODUCT DISPENSING CONTAINER
Filed Oct. 18, 1967   2 Sheets-Sheet 2
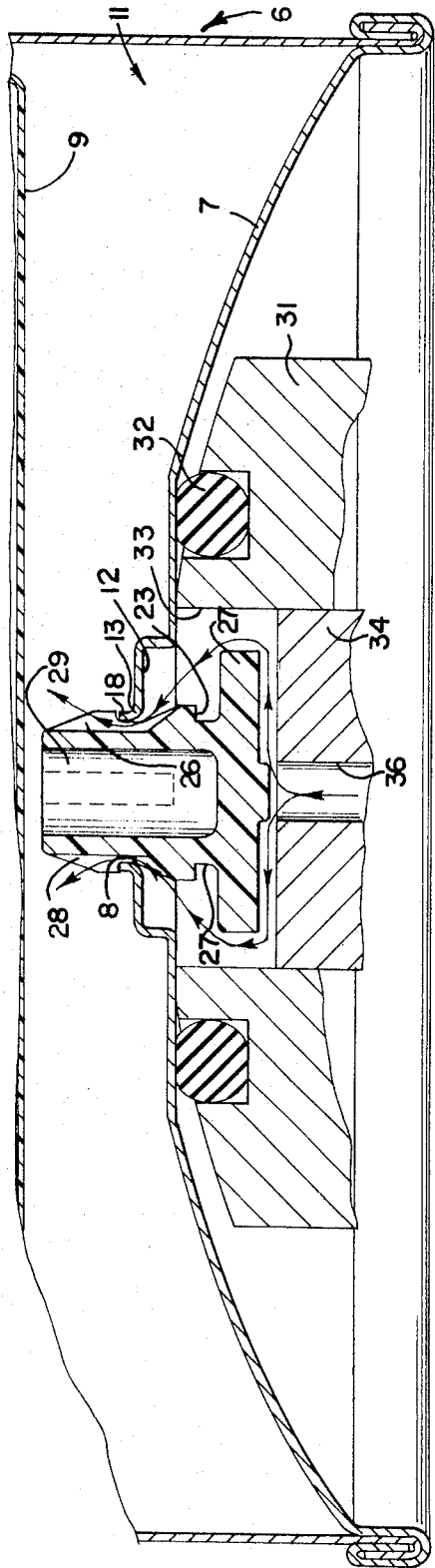
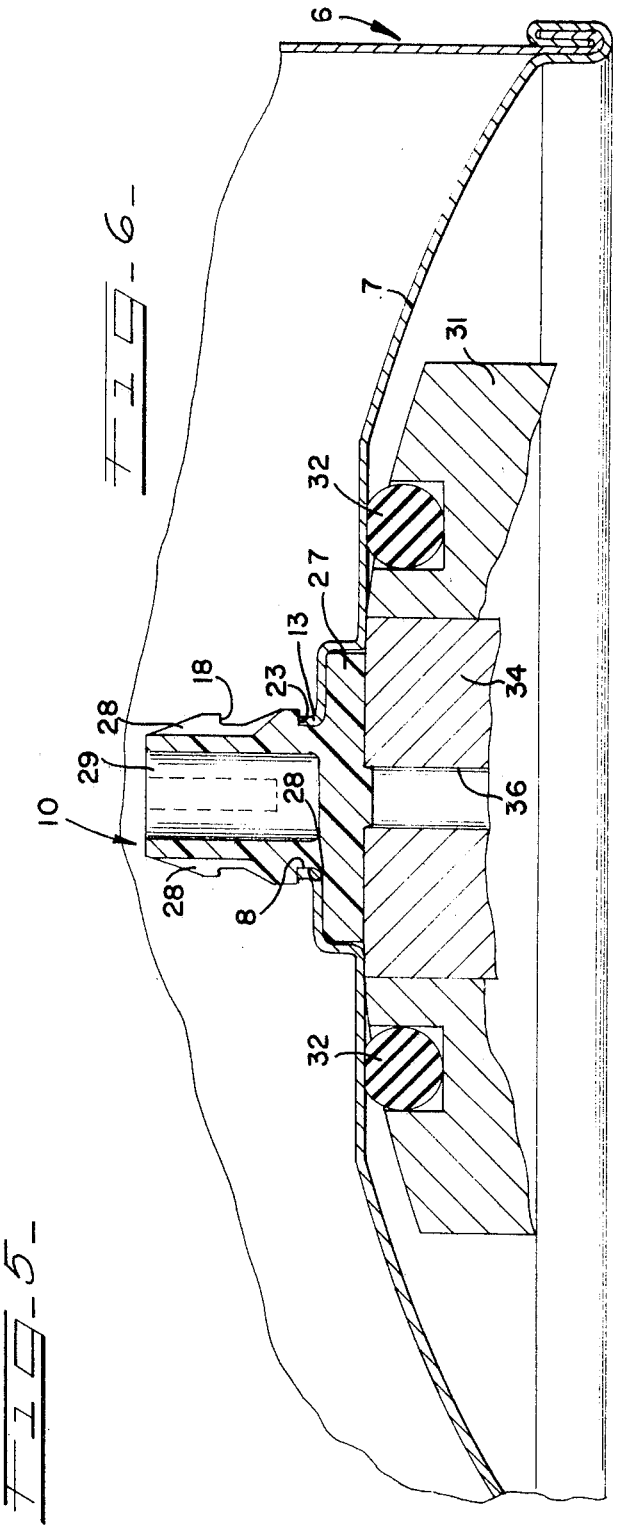
INVENTOR
JOHN B. NICHOLSON
BY *Fred P. Kostka*
ATT'Y.

United States Patent Office 3,522,900
Patented Aug. 4, 1970

3,522,900
VALVE FOR PRODUCT DISPENSING CONTAINER
John B. Nicholson, Country Club Hills, Ill., assignor to Continental Can Company, Inc., New York, N.Y., a corporation of New York
Filed Oct. 18, 1967, Ser. No. 676,294
Int. Cl. B65d *51/16*
U.S. Cl. 220—44                                     6 Claims

ABSTRACT OF THE DISCLOSURE

A valve formed with a body having lengthwise spaced upper and lower peripheral annular shoulders so that the valve is inserted into a wall or vent opening in a container in two stages. Fluid passages are formed in the valve body between the annular shoulders so that in the first insertion stage fluid communication is established between the container interior and exterior. A base flange is spaced from the lowermost of the annular shoulders to coact therewith and seal the vent opening.

BACKGROUND OF THE INVENTION

Field of the invention

The present invention relates to a valve for a product dispensing container of the type having separate product and propellant chambers, and more particularly to a valve for charging the propellant into the propellant chamber and sealing the propellant therein.

The prior art

Heretofore, it has been common practice to use a rubber grommet to seal the vent opening through which the propellant is charged into the propellant chamber. The grommet was inserted either prior or subsequent to the charging of the propellant. When inserted prior, the propellant was introduced into the propellant chamber by means of a needle forced through the rubber grommet. When the propellant was charged directly through the vent opening, the insertion of the grommet was required to be quickly accomplished to maintain the desired charge within the chamber.

Under both conditions of insertion of the propellant using the grommet as a sealing means, the equipment was somewhat complex requiring frequent inspection and maintenance to assure proper functioning.

SUMMARY OF THE INVENTION

By the present invention, it is proposed to provide a valve for use in the foregoing environment which is of a simple design and economical structure so as to overcome the difficulties encountered heretofore.

Generally, this is accomplished by valve structure including a one-piece valve body having means formed thereon to obtain a two stage insertion into the vent opening. Fluid passages are formed in the valve body to provide fluid communication between the interior and exterior of the propellant chamber when the valve is in the first insertion stage. In the second insertion stage, the fluid passages are disposed wholly within the propellant chamber and means are formed on valve body for sealing the vent opening.

DESCRIPTION OF THE DRAWINGS

FIG. 5 is a fragmentary cross sectional view of the lower end of a container showing the charging valve of the embodiment of FIGS. 1 and 2 in its first stage of insertion in the vent opening in the bottom closure plate; and FIG. 6 is a view similar to FIG. 5, but showing the charging valve inserted in its second stage of insertion in sealing relationship in the vent opening.

PREFERRED EMBODIMENT

Figure 1:
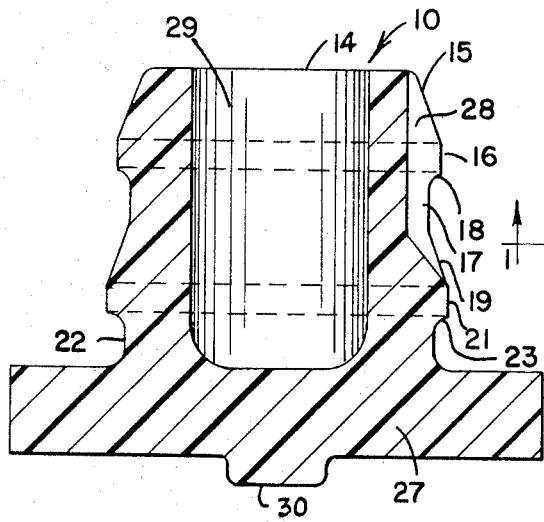
FIG. 1 is a cross sectional elevational view of one form of charging valve constructed in accordance with the present invention taken generally along the lines 1—1 of FIG. 2.

Referring now to FIGS. 5 and 6, there is shown a product dispensing container 6 having a bottom closure plate 7 formed with a vent opening 8 into which there is inserted a valve 10 embodying the structure of the present invention.

The product dispensing container 6 is of the general type having a product bag 9 disposed therein and defining a propellant chamber 11. Attached to the upper end of the container 6 now shown is a product dispensing valve assembly also not shown. The bottom closure plate 7 is formed with the vent opening 8 through which the propellant fluid is charged into the propellant chamber 11. As shown the vent opening 8 may be formed in an axially recessed portion 12 in the closure plate 7 and bounded by an upstanding peripheral flange 13.

Figure 2:
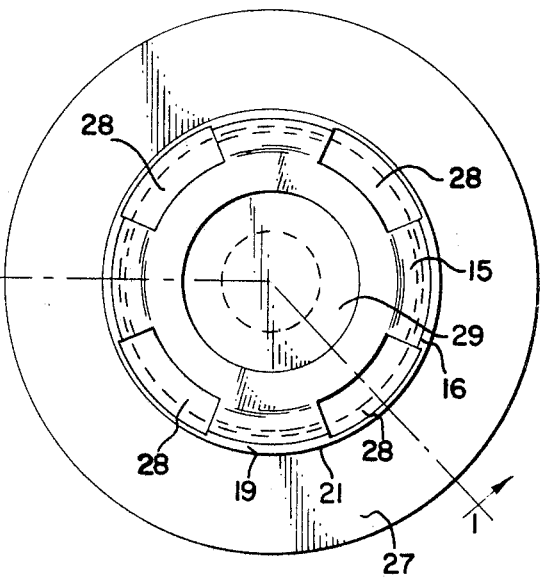
FIG. 2 is a top plan view of the charging valve structure shown in FIG. 1.

Referring now to FIGS. 1 and 2 the charging valve 10 is formed as a unitary structure as by molding from a suitable plastic such as polyethylene or the like. The valve 10 includes a body 14 having an upper frusto-conical section 15 of which the upper end is of lesser diameter than the vent opening 8 and of which the lower end is of greater diameter.

Contiguous with the lower end of the upper frusto-conical section 15 is a first cylinder section 16 of substantially the same diameter as the lower end of the frusto-conical section 15. Extending from the underside of the first cylindrical section 16 is a second cylindrical section 17 and having a diameter of lesser diameter the former and substantially equal to the vent opening so as to define a shoulder 18 which overlies the peripheral flange 13 in a first stage of insertion of the valve 10.

Projecting from the lower end of the second cylindrical section 17 is a lower frusto-conical section 19 which merges at the lower end thereof with a third cylindrical section 21. Depending from the third cylindrical section 21 is a fourth cylindrical section 22 of lesser diameter than the former and defining a second shoulder 23 which is also seatable over the peripheral flange 13 to provide a second stage of insertion. It is to be noted that the third and fourth cylindrical sections 21 and 22 are of somewhat greater diameter than the first and second cylindrical sections 16 and 17, respectively, to provide a sealing fit within the vent opening 8 in the second insertion stage.

Extending from the lower end of the fourth cylindrical section is a base flange 27 which is received within the axial recess 12 formed in the bottom closure. The base flange 27 is spaced from the second shoulder 23 so as to securely fasten the valve 10 against vertical displacement within the vent opening 8.

Radial grooves or slots 28 formed in the sides of body extending vertically upward from above the third cylindrical section 21 through the upper end of the upper frusto-concial section 15. The grooves 28 define passages providing fluid communication between the exterior of the container 6 and the propellant chamber 11 when the valve 10 is in the first insertion stage as shown in FIG. 5.

To render the body 14 somewhat radially resilient there may be provided an axial bore 29 extending downwardly in the body 14 and terminating above the base flange 27. Formed on the underside of the base may be a locating boss 30.

Referring now in particular to FIGS. 5 and 6 there is illustrated a typical apparatus which may be used for inserting the valve into the vent opening 8. As shown, the apparatus includes a spindle 31 having an O-ring 32 seated in the upper end thereof and forming a seal about the vent opening 8. Vertically reciprocable within an axial bore 33 is a plunger 34 having an axial passage 36 which is suitably connected to a source of fluid propellant.

Initially the valve 10 is supported on the plunger 34 with the boss 30 disposed in the passage 36. Thereafter, the plunger 34 is moved vertically relative to the container 6 so that the upper frusto-conical section 15 and the first cylindrical section are forced upwardly and resiliently yield radially during entry through the vent opening 8 to the first stage of insertion with the shoulder 18 overlying the peripheral flange 13.

In this position of the valve 10 the passages 28 provide fluid communication from the bore 33 of the spindle 31 to the propellant chamber 11. To charge the propellant fluid into the chamber 11 the plunger 34 is lowered slightly to clear the valve boss 30 thereby to permit fluid passage thereabout, and the propellant fluid is introduced into the propellant chamber 11 via the bore 33 and valve passages 28 as shown by the arrows.

Thereafter the plunger 34 is again moved vertically upward relative to the container 6 so that the valve assumes the second insertion position shown in FIG. 6. In this position the shoulder 23 overlies the peripheral flange 13 and coacts with the base flange 27 to secure the valve 10 against vertical movement. At the same time the fourth cylindrical section 22 which is of greater diameter than the second cylindrical section is yieldably held against the sides of the opening peripheral flange 13 to effectively seal the fluid propellant within the propellant chamber 11. It is also to be noted that the base flange 27 is seated within the axial recess 12 so that the valve is further secured against lateral shifting.

Figure 3:
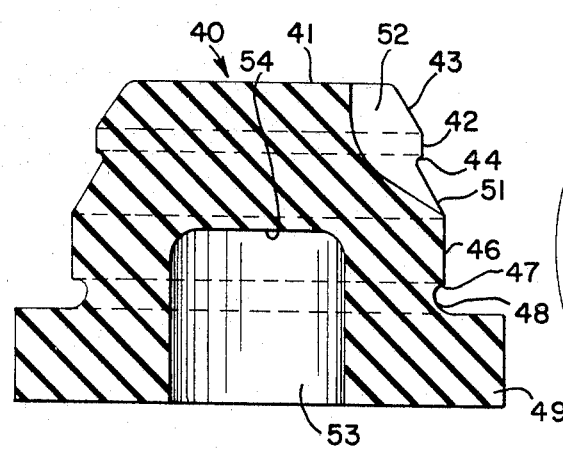
FIG. 3 is a cross sectional view of another embodiment of charging valve constructed in accordance with the present invention taken generally along the lines 3—3 of FIG. 4.
Figure 4:
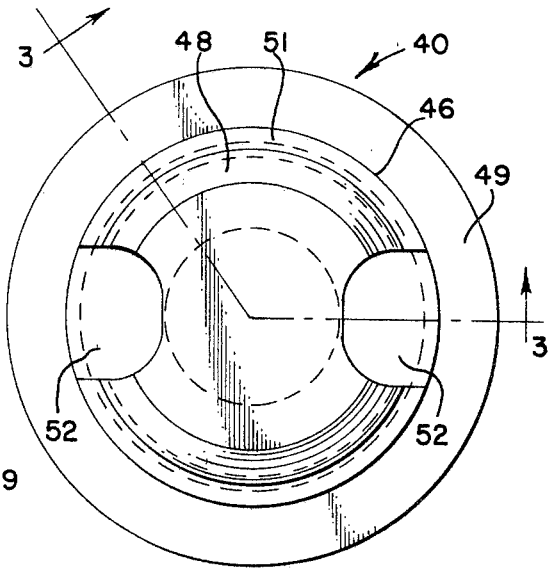
FIG. 4 is a top plan view of the charging valve shown in FIG. 3.

Referring now to FIGS. 3 and 4, there is shown a second embodiment of valve constructed in accordance with the present invention and which may be used as similarly to the valve 10 described above. The valve 40 is preferably formed of rubber and includes a body 41 of a substantially circular cross-section. Spaced lengthwise from the upper end of the body 41 is a first cylindrical section 42 which is contiguous with an upper frusto-conical section 43. The upper end of the upper frusto-conical section 43 is formed of lesser diameter than the vent opening 8.

The underside of the cylindrical section 42 is undercut to define an annular shoulder 44 which is seatable about the peripheral flange 13 of the vent opening 8.

Spaced lengthwise from the first cylindrical section 42, is a second cylindrical section 46 of which the underside is formed with an annular shoulder 47 merging with a restricted neck end portion 48 of greater diameter than the vent opening 14 so as to be compressed therein. Extending from the necked portion 48 is an enlarged base flange 49 which is seatable within the axial recess 12.

Extending between the underside of the cylindrical portion 42 and the upper end of the upper side of the cylindrical section 46 is a second frusto-conical section 51 of which the upper end is less than the diameter of the cylindrical section 42 so as to define the shoulder 44. The height of the necked portion 48 is preferably somewhat less than the height of the peripheral vent flange 13 thereby to snugly embrace the latter.

The body 41 is formed with peripheral diametrically opposed grooves 52 extending from the upper side of the second cylindrical section 46 through the upper end of the upper frusto-conical section 43 to provide fluid passages between the exterior and interior of the container 6 when the valve 40 is inserted to engage the annular shoulder 44 over the flange 13. A central recess 53 extending from the base of flange 49 upwardly into the second cylindrical section 46 may be formed on the underside of the body 41.

The recess 53 is sized to receive an insertion tool (not shown) which may be employed with the apparatus of FIGS. 5 and 6 to force the valve 40 into the vent opening 8. The insertion tool may be disposed in the passage 36 and support the valve thereon. In this connection, it should be mentioned that the upper end or wall 54 of the recess 53 is located so that upon insertion through the opening 8, a tension force is applied on the body 11, whereby the rubber body is elongated and reduced in diameter during the application of the upwardly directed insertion force. When the annular shoulder 44 is disposed above the peripheral flange 13, the insertion tool is retracted whereupon the shoulder 44 serves to hold the valve 40 in the first stage of insertion.

Thereafter, the insertion tool is retracted to permit propellant to be applied into the propellant chamber 11 as described above in connection with the embodiments of FIGS. 5 and 6 via the bore 33 and valve passages 52.

After the propellant chamber 11 has been filled with the fluid propellant to the desired extent, the insertion tool may again be thrust upwardly through the passage 36 of the apparatus shown in FIGS. 5 and 6 and into the valve recess 53 to again force the valve 40 upwardly so that the shoulder 47 overlies the peripheral flange 13 and the latter is disposed within the necked portion 48. In this position, the base flange 49 is seated within the annular recess in the bottom closure plate 7 of the container 6 and seals the propellant within the chamber 11.

I claim:

1. A valve for insertion into a vent opening in the wall of a container, said valve comprising a body of generally circular cross-section, said body including a terminal end having a diameter no greater than said vent opening, a first shoulder means spaced lengthwise from said terminal end, a second shoulder means spaced lengthwise from said terminal end a greater distance than said first shoulder means, said first shoulder means and said second shoulder means each having an outer diameter greater than said vent opening so that said first and second shoulder means overlies the edge portions of said vent opening when inserted therein, fluid passage means formed in said body radially inwardly of the periphery of said opening and extending longitudinally between said second shoulder means and said terminal end to provide fluid communication through said vent opening between the opposite sides of said wall when said valve body is inserted into said vent opening into a first stage of insertion wherein said first shoulder means is seated in overlying relation with the edge of said vent opening portions and said second shoulder means is spaced lengthwise from said first shoulder means on the opposite side of said wall, and a base flange spaced from said second shoulder means to embrace the edge portion of said opening therebetween and thereby to seal said opening and hold said valve member against further vertical displacement therein when said valve body is further inserted into said opening to a second stage of insertion wherein said fluid passage means are wholly on one side of said wall.

2. The invention as defined in claim 1 wherein said fluid passage means comprises radially extending grooves angularly spaced about said body and extending into said body section a depth defining an inner wall spaced inwardly from the periphery of said vent opening.

3. The invention as defined in claim 2 wherein said first and second shoulder means are substantially annular and wherein said body includes a first frusto-conical section between said first shoulder means and said terminal end, said frusto-conical section having a minor diameter of said terminal end and a major diameter of said outer diameter of said first annular shoulder means.

4. The invention as defined in claim 3 wherein said body includes a first cylindrical section of which said first shoulder means forms an annular portion of the base thereof and said first frusto-conical section is contiguous therewith.

5. The invention as defined in claim 3 wherein said body includes a second frusto-conical section spaced from and disposed in the same attitude as said first frusto-conical section and having a major diameter of said outer diameter of said second annular shoulder means.

6. The invention as defined in claim 4 wherein said base flange is substantially annular having an outer diameter greater than said outer diameter of said first and second annular shoulder means, and wherein a body portion is disposed between said base flange and said second annular shoulder means, said body portion being shaped to sealingly engage the periphery of said vent opening.

References Cited

UNITED STATES PATENTS

| | | | |
|---|---|---|---|
| 2,655,280 | 10/1953 | Cuttell | 215—56 X |
| 2,669,370 | 2/1954 | Royall | 215—56 X |
| 2,950,813 | 8/1960 | Koones | 220—44 X |
| 3,133,666 | 5/1960 | Henchert | 220—60 |

GEORGE E. LOWRANCE, Primary Examiner